US005541381A

United States Patent [19]
Galbraith et al.

[11] Patent Number: 5,541,381
[45] Date of Patent: Jul. 30, 1996

[54] SHEET METAL WORKING ELECTRODE AND HANDPIECE

[75] Inventors: Donald L. Galbraith; Richard P. Tice, both of Spokane, Wash.

[73] Assignee: U.S. Dent Master, Inc., Spokane, Wash.

[21] Appl. No.: 431,711

[22] Filed: Apr. 28, 1995

Related U.S. Application Data

[63] Continuation of Ser. No. 110,571, Aug. 23, 1993.
[51] Int. Cl.$^6$ .......................... B23K 11/28; B23K 11/31
[52] U.S. Cl. ............................ 219/86.21; 219/86.25; 219/86.8; 219/86.9
[58] Field of Search .................... 219/86.1, 86.21, 219/86.25, 86.8, 86.9, 119

[56] References Cited

U.S. PATENT DOCUMENTS

| | | | |
|---|---|---|---|
| 2,245,920 | 6/1941 | Jardine et al. | 219/86.25 |
| 2,346,088 | 4/1944 | Shobert | 219/119 |
| 2,442,152 | 5/1948 | Truax et al. | 219/234 |
| 2,498,869 | 2/1950 | Waerde | 219/86.25 |
| 2,812,418 | 11/1957 | Allan et al. | 219/86.21 |
| 3,080,470 | 3/1963 | Davis | 219/86.21 |
| 3,510,623 | 5/1970 | Wolgast | 219/86.21 |
| 3,959,619 | 5/1976 | Schill | 219/86.21 |
| 4,924,055 | 5/1990 | Nakahigasi et al. | 219/86.21 |
| 5,101,094 | 3/1992 | Keller et al. | 19/233 |
| 5,187,347 | 2/1993 | Leef | 219/119 |
| 5,239,155 | 8/1993 | Olsson | 219/86.25 |

FOREIGN PATENT DOCUMENTS

| | | | |
|---|---|---|---|
| 1086819 | 8/1954 | France | 219/86.21 |
| 159053 | 2/1983 | Germany | 219/119 |
| 317266 | 12/1988 | Japan | 219/119 |
| 1505719 | 9/1989 | U.S.S.R. | 219/119 |

OTHER PUBLICATIONS

3 Photocopies of a Spot Welder in Use Prior to Aug. 23, 1992.

*Modern Welding*, by Althouse et al., pp. 424–425, Dec. 1988.

*Primary Examiner*—Teresa J. Walberg
*Assistant Examiner*—J. Pelham
*Attorney, Agent, or Firm*—Wells, St. John, Roberts, Gregory & Matkin

[57] ABSTRACT

A sheet metal working electrode handpiece is described for delivering electric current from a source of electrical energy to a selected location on a sheet metal workpiece. The electrode has an electrically insulated handle with an electrical conductor having a connector for electrical contact with a source of electrical energy. A control switch on the handle provides electrical connection to the source of electrical energy to control delivery of electrical energy to the conductor. A first electrode adapter is provided on the handle, oriented along a first axis. A second electrode adapter is also provided on the handle, oriented along a second axis substantially normal to the first axis. Any one of several sheet metal engageable electrodes may be removably mounted to at least one of the adapters. One such electrode is a dent pulling electrode which includes a shank, threaded at one end to be received in one of the adapters. The shank is formed of carbon steel and includes a flat reduced end for engagement with a workpiece. A torque surface is situated between the shank ends to facilitate securing the electrode to the handpiece or engagement with a tool used to twist the electrode on its axis. Other electrodes include a copper shank, spherical end heat shrinking electrode, a spot welding electrode, a nail head welding electrode, and a chrome strip clip welding electrode.

20 Claims, 4 Drawing Sheets

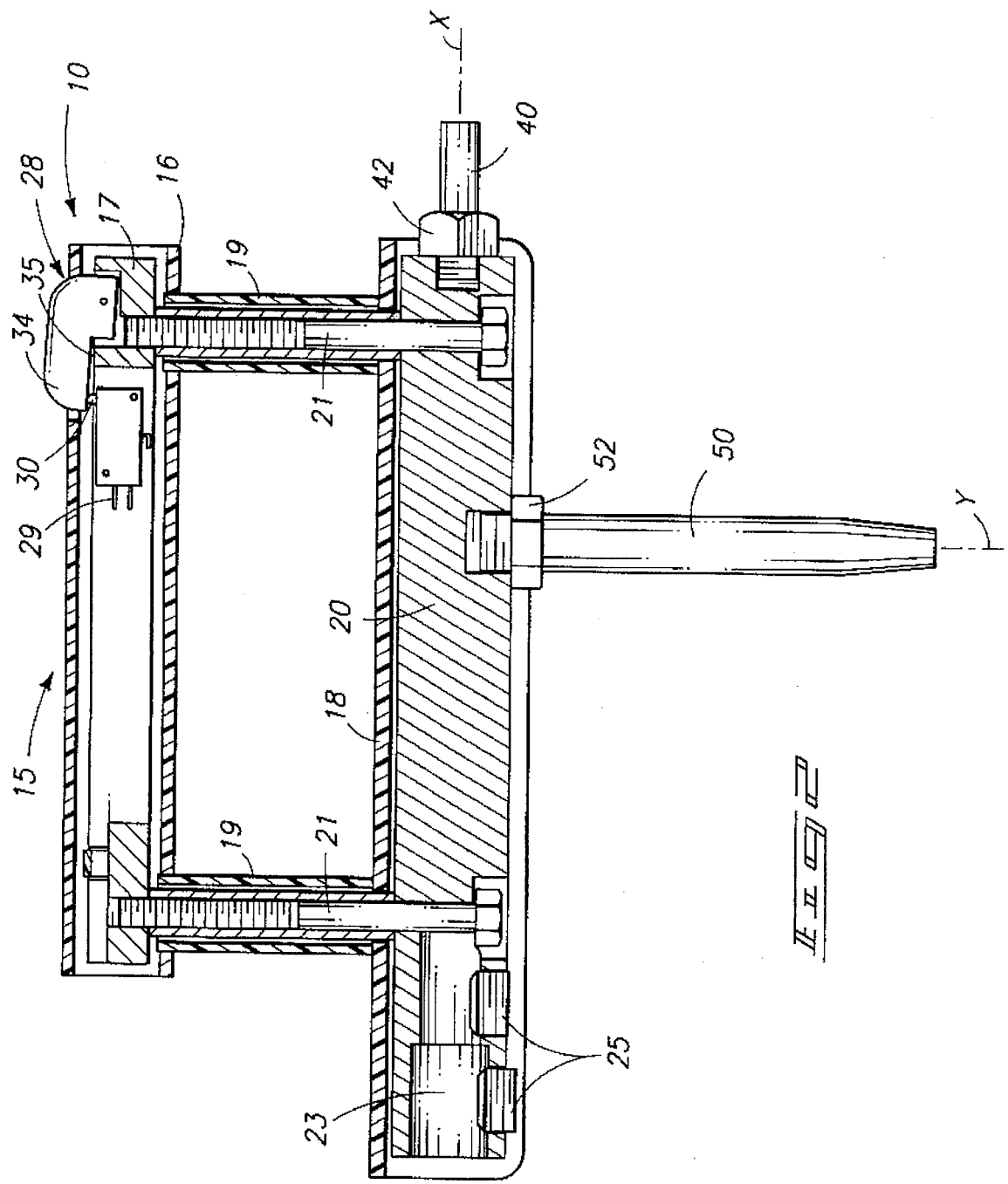

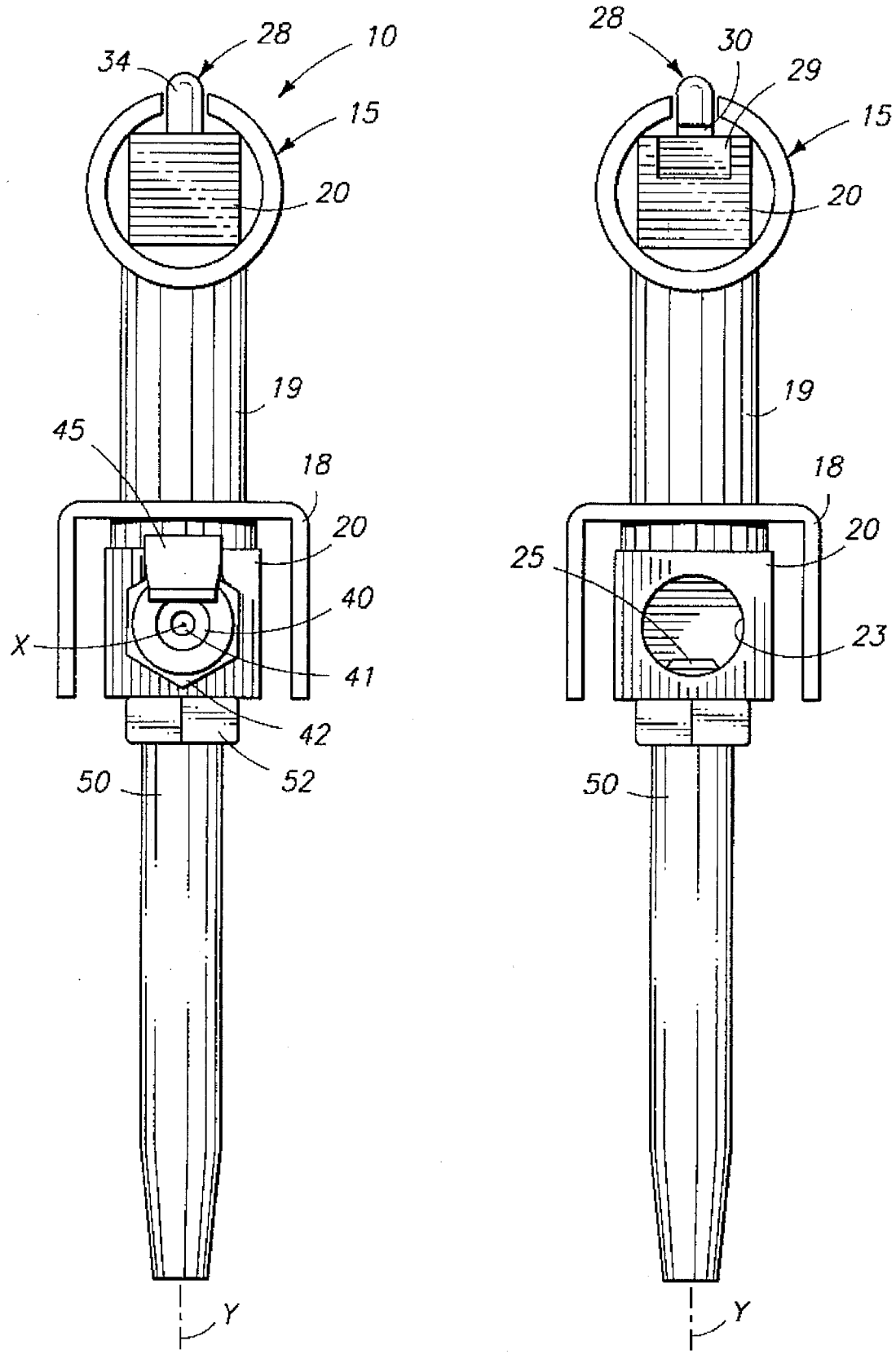

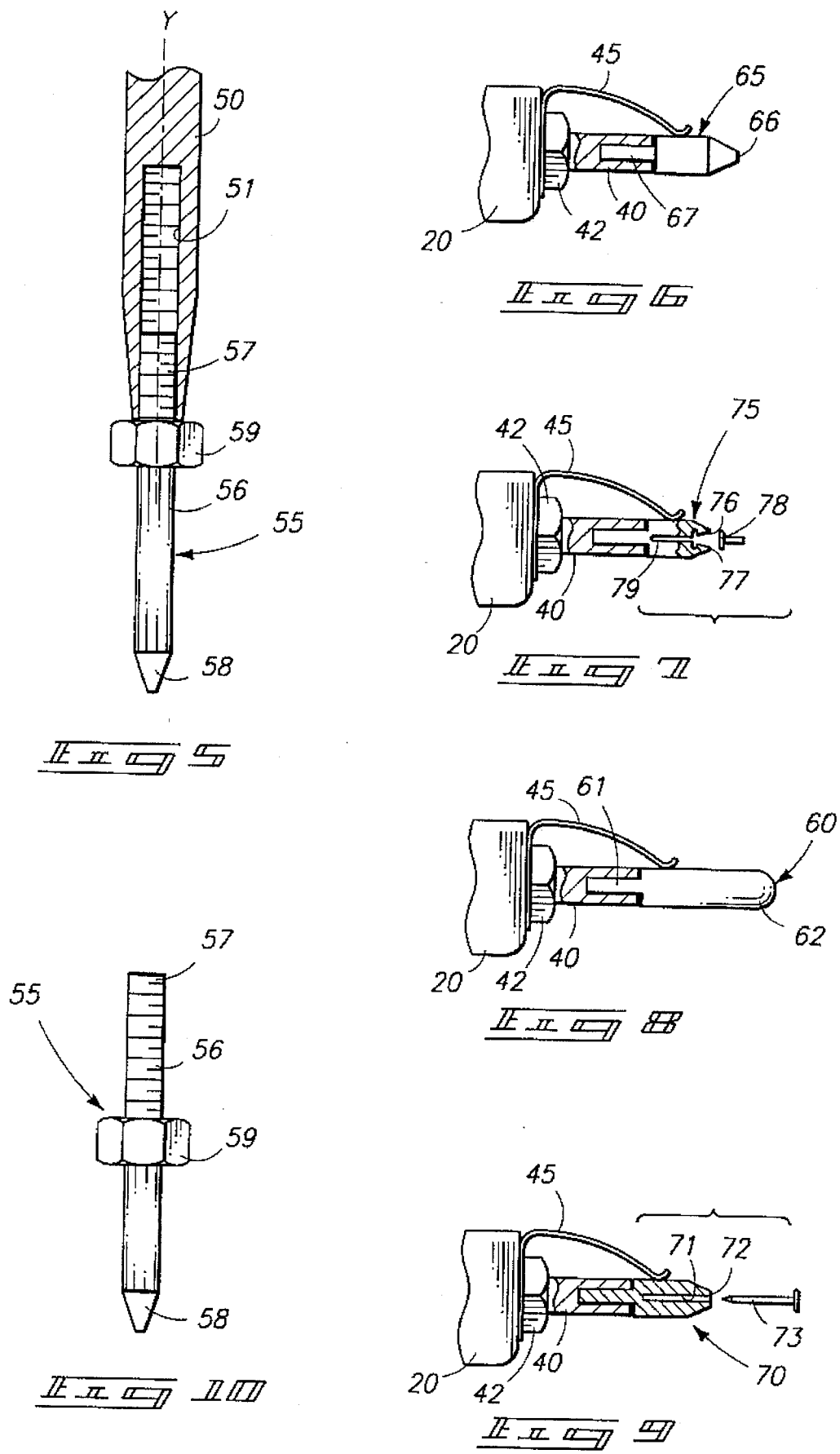

SHEET METAL WORKING ELECTRODE AND HANDPIECE

RELATED APPLICATIONS

The present application is a continuing application of co-pending U.S. patent application Ser. No. 08/110,571, filed Aug. 23, 1993.

TECHNICAL FIELD

The present invention relates to welding, forming, or shaping sheet metal using hand-held electrodes and handpieces for holding and electrically isolating the user from the electrode.

BACKGROUND OF THE INVENTION

Specialized electrical discharge devices have been developed for sheet metal working, for shaping and fastening sheet metal workpieces together. Tools, for example, have been developed for spot welding sheet metal pieces together. Other tools have been developed for attaching pullers to vehicle body dents, to aid in pulling the dents outwardly. Still other tools have been developed for heating and shrinking small areas on sheet metal panels to aid in removing dents or bumps. Each task requires a different electrode and attachment to the welder power source.

The present invention solves the problem by provision of a single handpiece capable of mounting any of several electrodes used for individual tasks. The present invention also fills the need for a single handpiece and electrode with capability for mounting the electrode at either of two different locations on the handpiece.

BRIEF DESCRIPTION OF THE DRAWINGS

Preferred embodiments of the invention are illustrated herein with reference to the accompanying drawings, in which:

FIG. 2 is a longitudinal sectioned view taken along line 2—2 in FIG. 1;

FIG. 3 is a front end elevation view;

FIG. 4 is a rearward end elevation view;

FIG. 5 is a partially sectioned side view showing a sheet metal dent puller stud mounted to the handpiece;

FIG. 6 is a partially sectioned side view showing a spot welder electrode mounted to the handpiece;

FIG. 7 is a partially sectioned side view showing a chrome clip welding electrode mounted to the handpiece;

FIG. 8 is a partially sectioned side view showing a sheet metal shrinking electrode mounted to the handpiece;

FIG. 9 is a partially sectioned side view showing a nail head welding electrode mounted to the handpiece; and FIG. 10 is a detail view of a preferred sheet metal dent pulling electrode.

DETAILED DESCRIPTION OF THE PREFERRED EMBODIMENTS

Figure 1:
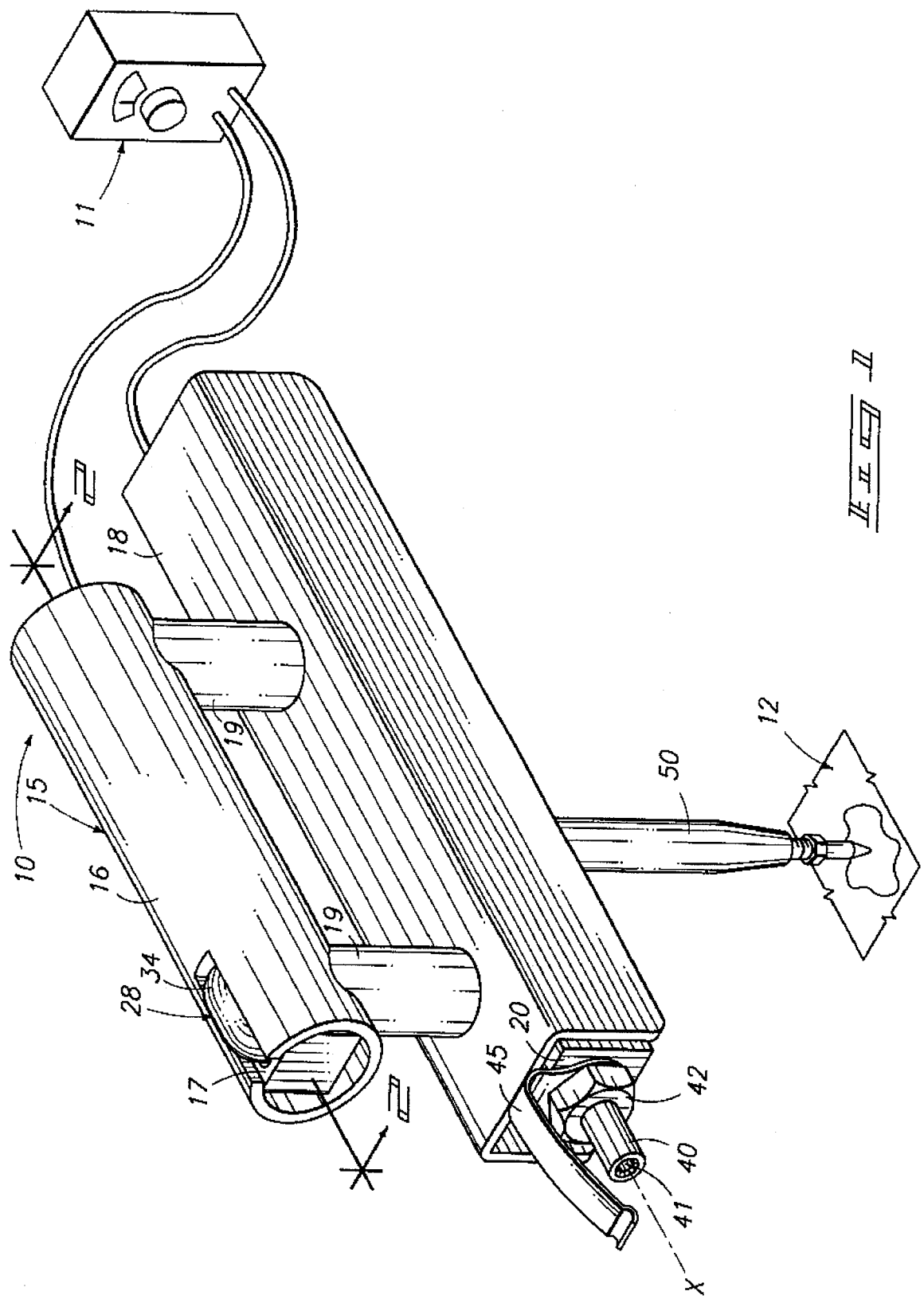
FIG. 1 is a perspective view of an electrode handpiece exemplifying features of a first preferred form of the present invention connected to a source of electrical energy.

This disclosure of the invention is submitted in furtherance of the constitutional purposes of the U.S. Patent Laws "to promote the progress of science and useful arts" (Article 1, Section 8).

A preferred embodiment of the present sheet metal working electrode handpiece is designated in the accompanying drawings by the reference numeral 10. The handpiece 10 is used as diagrammatically shown in FIG. 1 to deliver welding current from a source of electrical energy 11 to a selected location on a sheet metal workpiece 12. Various attachments are shown in the drawings and will be described in detail below.

The handpiece 10 includes an electrically insulated handle 15. The handle includes a nonconductive elongated hand grip section 16 that is tubular, housing a switch base 17. A conductor guard 18 of an inverted "U" shaped cross-section is mounted to and spaced from a hand grip section 16 by non conductive spacers 19.

An electrical conductor 20 is secured by mounting bolts 21 within the spacers 19 to the switch base 17, electrically isolated from the hand grip section 16 by the nonconductive handle material. The conductor 20 is advantageously formed of an electrically conductive metal such as aluminum, in the form of an elongated bar. The conductor 20 is housed within the inverted "U" shaped conductor guard 18, along the length thereof. Legs of the guard 18 project the adjacent sides of the conductor 20 (FIG. 4) to insulate the conductor from undesired electrical contact.

A connector 23 (FIG. 2) is provided on the conductor 20 for electrical contact with a source of electrical energy 11 (diagrammatically shown in FIG. 1). Conventional welding cable may be used for such connection. Connector 23 may thus simply be provided as a socket formed in one end of the conductor 20. One or more set screws 25 are provided in the conductor 20, communicating with the cable receiving socket, for securing and making electrical contact with the cable.

A control switch 28 is provided on the handle for electrical connection to the source of electrical energy to control delivery of electrical energy to the conductor 20 through the welding cable. The switch 28 advantageously includes a conventional micro switch 29 mounted within a recess in the switch base 17. The micro switch includes an actuator plunger 30 that is biased to hold the switch a normally open condition.

Switch 28 also includes a pivoted actuator button 34, mounted to the switch base 17 with an actuator surface projecting over the microswitch. A stop surface 35 (FIG. 2) is provided along the switch base 17, between the pivot for the actuator button 34 and the microswitch plunger 30. The surface 35 is positioned in relation to the microswitch plunger 30 to stop inward movement of the actuator beyond that required to move the switch to a closed condition. The stop surface 35 thus prevents damage to the switch by forcible impact against the actuator button 34.

A first electrode adapter 40 is provided on the handle, oriented along a first axis X. As exemplified in FIG. 2, the first axis is parallel to the hand grip section 16. The preferred first adapter 40 includes a conductive socket member threaded into the end of the conductor at the end thereof. A locknut 42 holds the adapter securely on the conductor 20.

Adapter 40 includes an axial bore 41 (FIG. 1) that opens in a forward direction along axis X. A spring clip keeper 45 is mounted between the locknut 42 and conductor 20. The outward end of keeper 45 is bent toward the axis X to engage and hold selected electrodes within the smooth, unthreaded bore.

A second electrode adapter 50 is also provided on the handle, oriented along a second axis Y that is substantially normal to the first axis X. The adapter 50 includes a conductive socket member threaded into the end of the conductor on the bottom side thereof, and substantially centered longitudinally along the hand grip section 16. A locknut 52 holds the adapter securely on the conductor 20.

The second adapter 50 includes an axial bore 51 (FIG. 5) that opens at the bottom end of the socket member in a downward direction along axis Y. The bore 51 is threaded to threadably receive an electrode shank.

The adapter 50 in a preferred form, is elongated, extending several inches downwardly from the conductor 20. The length (along axis Y) is sufficient to allow the adapter to be received within depressions in sheet metal (as in vehicle body dents). It is preferably constructed of copper.

A sheet metal engageable electrode is removably mountable to at least one of the adapters. Several preferred electrodes are provided, each for performing a particular function. The examples shown include a novel dent pulling electrode 55 (FIGS. 5 and 10), a metal shrinking electrode 60, a spot welding electrode 65, and nail (FIG. 9) and chrome clip (FIG. 7) welding electrodes 70, 75.

The preferred novel dent pulling electrode 55 (FIG. 5) includes an elongated shank 56, formed of medium carbon alloy steel, equivalent to an SAE grade 8 bolt shank, having a Rockwell hardness of approximately c33/c39. The preferred shank is partially threaded at one end 57. The opposite end 58 is tapered to a flat sheet metal engaging tip of approximately 0.06 inches in diameter. A torque surface is provided along the shank between the ends 57, 58, advantageously at the transition to the threaded section of the shank 56. Depending on the shank size, the threaded portion may either be threaded into the second electrode adapter socket or slidably engaged in the first electrode socket.

In a preferred form, the torque surface is provided by a lock nut 59 threaded onto the threaded part of the shank. The nut may be jammed against the unthreaded part of the shank, to lock itself on the shank against rotation. Flats on the nut 59 provide gripping surfaces for a wrench (not shown) which can be used to twist the electrode on its axis, disengaging it from a sheet metal surface where it becomes welded during use. Alternatively, the nut may be loose on the threaded portion, to be tightened against the adapter 50, thereby securing the electrode to the handpiece.

The metal shrinking electrode 60, in a preferred form (FIG. 8), is constructed of copper and includes a shank 61 adapted to be slidably received in the axial bore of the first electrode adapter 40. The outward end of the shank 62 is spherical and smooth to avoid welding of the electrode to the sheet metal workpieces. The tangential point contact between the copper spherical surface promotes surface heating of the sheet metal in the vicinity of the point contact, which then effects shrinkage in the adjacent areas as the metal cools.

The spot welding electrode 65 (FIG. 6) is somewhat structurally similar to the dent pulling electrode 55, with the exception that the preferred electrode material is copper and the reduced flat tip 66 of electrode 65 has a somewhat larger diameter, of approximately 0.1 inches. Its shank 67 is smooth, to be received in the first electrode adapter 40. Electrode 65 is also formed of copper to present excellent conductivity and to resist self welding to the sheet material. The flat tip 66 serves to contact and press sheet metal workpieces together and to conduct and concentrate electrical flow in amounts sufficient to fuse the juxtaposed sheets of material together in the vicinity of the tip contact. According to need, the electrode may be made to slidably fit adapter 40 or be threaded to fit or even to replace the second adapter 50.

The nail welding electrode 70 (FIG. 9) and the chrome clip welding electrode 75 (FIG. 7) both include copper shanks with central bores 71, 76 formed in outward tips 72, 77 to receive shanks 73 of headed nails or headed ends 78 of chrome strip mounting clips. The chrome clip welding electrode 75 also includes axial slots 79 that allow the bore 76 to be sprung open to yieldably receive the clip heads 78. The electrodes 70, 75 may be mounted selectively in either first or second adapter 50, but find most prevalent use in the first electrode adapter 40.

In use the present handpiece is attached to a source of electrical energy, such as the power source 11 specifically provided for such handpieces and electrodes and produced by "Dentmaster Inc." of Spokane Washington. This is done simply by attaching a power cable from the welder to the connector on the handpiece, using the set screws to secure and make full electrical contact.

Next the control switch 29 is connected to the appropriate timer circuitry of the welder unit, such that actuation of the control switch will close a circuit for a selected amount of time, and allow current to flow to the handpiece conductor 20 and out through the electrode currently contacting a conductive workpiece.

The handpiece, once connected to the source of current and controls, is ready for use.

If used as a dent puller, a ground wire is mounted to the sheet metal workpiece and a dent pulling electrode 55 is attached to the handpiece 10, preferably threaded to the second electrode adapter 50. Next, the handle 15 is grasped and maneuvered so the flat pointed end of the electrode 55 is pressed firmly against the dented sheet metal, preferably in the deepest part of the dent and with the flat end surface flush against the dented surface. Now the control switch 29 may be activated, causing the selected timed current flow through the electrode 55 and into the workpiece.

Because of the small contact area, timed discharge, and high current flow, the carbon steel tip of the electrode quickly welds itself to the workpiece. Now the handpiece handle may be used to pull against the electrode 55, and the engaged area of the workpiece, causing the dent to be pulled outwardly. If the electrode is securely threaded to the handpiece and the nut has been tightened against the threaded adapter 50, the handpiece 10 itself may be used to apply the separating torque. Alternatively, when the dent has been pulled, a wrench may be attached to the nut 59 on the electrode 55. Torque may then be applied about the electrode axis to snap the electrode weld and allow separation of the electrode from the workpiece.

The remaining attachments operate similarly as described above, with the exception that smooth shank electrodes are simply slid into the socket of the first adapter. Use is determined by the work to be accomplished, but basically involves engagement of the electrode with the workpiece and actuation of the control switch 29.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A sheet metal working electrode handpiece, comprising:

a hand grip;

an electrical conductor attached to the hand grip; and two distinct electrode adapters mounted to and in electrical connection to the conductor.

2. A sheet metal working electrode handpiece for delivering welding current from a source of electrical energy to a selected location on a sheet metal workpiece, wherein the electrode is comprised of:

an electrically insulated handle;

an electrical conductor for electrical contact with a source of electrical energy, mounted to and electrically isolated from the handle;

a control switch connected to the conductor for electrical connection to the source of electrical energy to control delivery of electrical energy to the conductor;

a first electrode adapter on the electrical conductor, oriented along a first axis;

a second electrode adapter on the electrical conductor, oriented along a second axis spaced apart from the first axis; and a sheet metal engageable electrode removably mountable to at least one of the electrode adapters including an elongated conductive shank extending to an end and including a gripping surface on the shank in a fixed position thereon.

3. A sheet metal working electrode handpiece as claimed by claim 1, wherein the handle is elongated and wherein the first axis extends longitudinally with respect to the elongated handle.

4. A sheet metal working electrode handpiece as claimed by claim 1, wherein the handle is elongated along a handle axis; and wherein the second axis is distinct from the first axis and the handle axis.

5. A sheet metal working electrode handpiece as claimed by claim 1, wherein the handle is elongated along a handle axis and wherein the second axis is substantially perpendicular to the handle axis.

6. A sheet metal working electrode handpiece as claimed by claim 1, wherein the first and second adapters are comprised of electrically conductive socket members for releasably receiving an electrode.

7. A sheet metal working electrode handpiece as claimed by claim 1, wherein the electrode is comprised of:

an elongated shank of electrically conductive metal;

wherein the shank includes a sheet metal engaging tip.

8. A sheet metal working electrode handpiece as claimed by claim 1, further comprising a sheet metal shrinking electrode, including:

an elongated copper shank slidably receivable in one of the electrode adapters;

a semi-spherical head on the elongated copper shank.

9. A sheet metal working electrode handpiece as claimed by claim 1, further comprising a spot welding electrode formed of copper and including:

an elongated shank extending to a pointed end.

10. A sheet metal working electrode handpiece as claimed by claim 1, wherein the electrode is comprised of:

an elongated steel shank; and a bolt head on the shank in fixed position thereon.

11. A sheet metal working electrode handpiece as claimed by claim 1, wherein the electrode is comprised of:

an elongated shank formed of a SAE grade 8 bolt shank and extending from a socket receiving end to a pointed end; and a bolt head on the shank in fixed position thereon between the pointed end and the socket receiving end.

12. A sheet metal working electrode handpiece as claimed by claim 1, further comprising a nail welding electrode, including:

an elongated shank for attachment to one of the electrode adapters formed of electrically conductive material and extending between a socket receiving end and an outward end, and including an axial bore formed inward from the outward end.

13. A sheet metal working electrode handpiece for delivering welding current from a source of electrical energy to a selected location on a sheet metal workpiece, wherein the electrode handpiece is comprised of:

an electrically insulated handle including an elongated hand grip section;

an elongated electrical conductor electrically isolated from the hand grip section longitudinally in spaced juxtaposition relative to the hand grip section;

a connector connected to the electrical conductor for electrical contact with a source of electrical energy;

a control switch connected to the conductor for electrical connection to the source of electrical energy to control delivery of electrical energy to the electrical conductor;

a first electrode adapter on the electrical conductor opening outwardly along a first axis;

a second electrode adapter on the electrical conductor opening outwardly along a second axis disposed independently of the first axis, the second axis intersecting the handle length.

14. A sheet metal working electrode handpiece as defined by claim 13 wherein the first and second electrode adapters protrude outwardly from the electrical conductor.

15. A sheet metal working electrode handpiece for removably mounting an electrode and for delivering welding current from a source of electrical energy through the electrode to a selected location on a sheet metal workpiece, wherein the electrode handpiece is comprised of:

an electrically insulated handle including an elongated hand grip section;

an electrical conductor electrically isolated from the hand grip section for electrical contact with a source of electrical energy and including a switch base adjacent the hand grip;

a spacer separating a portion of the conductor from the hand grip section in substantially parallel and juxtaposed relation thereto;

a control switch on the switch base for electrical connection to the source of electrical energy to control delivery of electrical energy to the electrical conductor;

a first electrode adapter on the electrical conductor, oriented along a first axis that is longitudinally oriented with respect to the hand grip section; and a second electrode adapter on the electrical conductor, oriented along a second axis disposed independently of the first axis.

16. A sheet metal working electrode handpiece as defined by claim 15 wherein the handpiece is further comprised of an electrically nonconductive conductor guard mounted to the spacer for housing a portion of the electrical conductor.

17. A sheet metal working electrode handpiece as defined by claim 15 wherein the first and second electrode adapters protrude outwardly from the electrical conductor.

18. A sheet metal working electrode handpiece for removably mounting an electrode and for delivering welding current from a source of electrical energy through the electrode to a selected location on a sheet metal workpiece, wherein the electrode handpiece is comprised of:

an elongated electrically insulated handle including an elongated hand grip section;

an electrical conductor mounted to the hand grip section and electrically isolated therefrom;

the electrical conductor in spaced juxtaposition relative to the hand grip section;

a connector on the electrical conductor for electrical contact with a source of electrical energy;

a control switch for electrical connection to the source of electrical energy to control delivery of electrical energy to the electrical conductor;

a first electrode adapter on the electrical conductor located along a first axis that is longitudinally oriented with respect to the elongated hand grip section;

a second electrode adapter on the electrical conductor, located along a second axis disposed independently of the first axis and intersecting the hand grip section; and wherein at least one of the electrode adapters includes an electrode receiving socket for receiving an electrode.

19. A sheet metal working electrode handpiece as defined by claim 18 wherein the second electrode adapter is approximately centered along the length of the hand grip section.

20. A sheet metal working electrode handpiece as defined by claim 18 wherein the first and second electrode adapters are mounted to the electrical conductor and project outwardly therefrom.

\* \* \* \* \*